(12) United States Patent  (10) Patent No.: US 6,471,387 B1
Henshaw et al.  (45) Date of Patent: Oct. 29, 2002

(54) ILLUMINATED DISPLAY FOR A GAMING DEVICE

(75) Inventors: Lawrence M. Henshaw, Hammonton, NJ (US); Jerald C. Seelig, Absecon, NJ (US)

(73) Assignee: Atlantic City Coin & Slot Service Company, Inc., Pleasantville, NJ (US)

( * ) Notice: Subject to any disclaimer, the term of this patent is extended or adjusted under 35 U.S.C. 154(b) by 0 days.

(21) Appl. No.: 09/967,034

(22) Filed: Sep. 28, 2001

(51) Int. Cl.[7] ................................................. F21V 8/00
(52) U.S. Cl. .................... 362/555; 362/800; 273/143 R
(58) Field of Search ................................. 362/551, 552, 362/554, 555, 559; 340/815.45, 815.42, 815.43; 40/546, 547

(56) References Cited

U.S. PATENT DOCUMENTS 4,875,144 A  10/1989  Wainwright
5,152,529 A  * 10/1992  Okada .................... 273/143 R
5,375,043 A  * 12/1994  Tokunaga .................... 362/231
5,934,672 A  * 8/1999  Sines et al. .............. 273/138.1

FOREIGN PATENT DOCUMENTS

EP  0989 531 A2  3/2000
JP  200179137 A  *  3/2001

* cited by examiner

Primary Examiner—Sandra O'Shea
Assistant Examiner—Hargobind S. Sawhney
(74) Attorney, Agent, or Firm—Ian F. Burns

(57) ABSTRACT

An illuminated display for use with a gaming machine. The display has a case mounted to the gaming machine. A panel is mounted in the case. Animated objects are located on the panel. Several optical fibers have an end mounted in and around the animated objects. The other ends of the optical fibers are mounted adjacent several light sources. The light sources transmit visible light along the optical fibers. A controller is in communication with the light source. The controller causes the light sources to emit light in a predetermined sequence such that the animated objects on the panel are viewed by a game player as moving.

31 Claims, 4 Drawing Sheets

ILLUMINATED DISPLAY FOR A GAMING DEVICE

BACKGROUND OF THE INVENTION

1. Field of Invention

The present invention relates to a display for use with a gaming device that provides an entertaining image to a game player.

2. Description of Related Art.

Gaming devices are well known in the art and a large variety of gaming devices have been developed. In general, gaming devices allow users or players to play a game. In many casino-type gaming devices, the outcome of the game depends, at least in part, on a randomly generated event. For example, a gaming device may use a random number generator to generate a random or pseudo-random number. The random number may then be compared to a predefined table to determine the outcome of the event. If the random number falls within a certain range of numbers on the table, the player may win a predefined prize. The table may also contain display information that allows the gaming device to generate a display that corresponds to the outcome of the game. The gaming device may present the outcome of the game on a large variety of display devices, such as mechanical spinning reels or video screens.

Highly visible displays are utilized on gaming machines in order to attract players. Once players are attracted to the gaming machine, they tend to play longer because the display enhances the stimulation and excitement experienced by the game player. It is desirable for gaming machines to incorporate highly visible display devices.

Gaming displays are more successful if they stimulate one or more of the human senses. Players are attracted to games that use flashing lights and sounds. Displays that arouse the human senses are more stimulating to a game player and as a result are played for longer periods of time. This results in increased revenue for the gaming operator. One of the mediums used in display devices to attract the attention of players is light. Many casino games have flashing lights.

Optical fibers are known to conduct light. An example of the use of optical fibers is shown in U.S. Pat. No. 4,875,144 to Wainwright. This patent discloses a fabric with an illuminated changing display. The optical fibers are woven into the fabric. An end of the optical fiber protrudes through the fabric where it can be viewed. The optical fiber assembly of Wainwright, whilst suitable for garments is not suitable for gaming machines for several reasons. The weaving of optical fibers into fabric is a costly and time consuming process. The ends of the optical fibers also can be blocked by the fabric and as a result the display becomes dull and less vivid looking.

While lights have been used in conjunction with gaming displays, a current unmet need exists for a gaming display that utilizes light to produce an image that is entertaining, attractive and yet distinctive from other displays.

SUMMARY OF INVENTION

1. Advantages of the Invention

One of the advantages of the present invention is that it provides a gaming device that utilizes a highly visible display.

A further advantage of the present invention is that it provides a display that may be used with a primary game or a bonus game.

Another advantage of the present invention is that it provides a display that utilizes optical fibers.

Another advantage of the present invention is that it provides a display that generates an animated image using the optical fibers.

A further advantage of the present invention is that it provides a display that generates a movable image.

Another advantage of the present invention is that it provides a display that is attractive and entertaining to game players.

These and other advantages of the present invention may be realized by reference to other portions of the specification, claims, and abstract.

2. Brief Description of the Invention

The present invention comprises a display for use with a gaming machine. The display includes a case mounted to the gaming machine. The case defines a cavity therein. A panel is mounted in the case. Several optical fibers each have a first end and a second end. The first end of the optical fibers are attached to and extend through the panel. A light source is located adjacent the second end of the optical fibers. The light source transmits visible light along the optical fibers. A controller is in communication with the light source. The controller causes the light source to emit light in a predetermined sequence such that recognizable images on the panel are viewable by the game player.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Preferred embodiments of the present invention are shown in the accompanying drawings wherein.

DESCRIPTION OF THE PREFERRED EMBODIMENT

Figure 1:
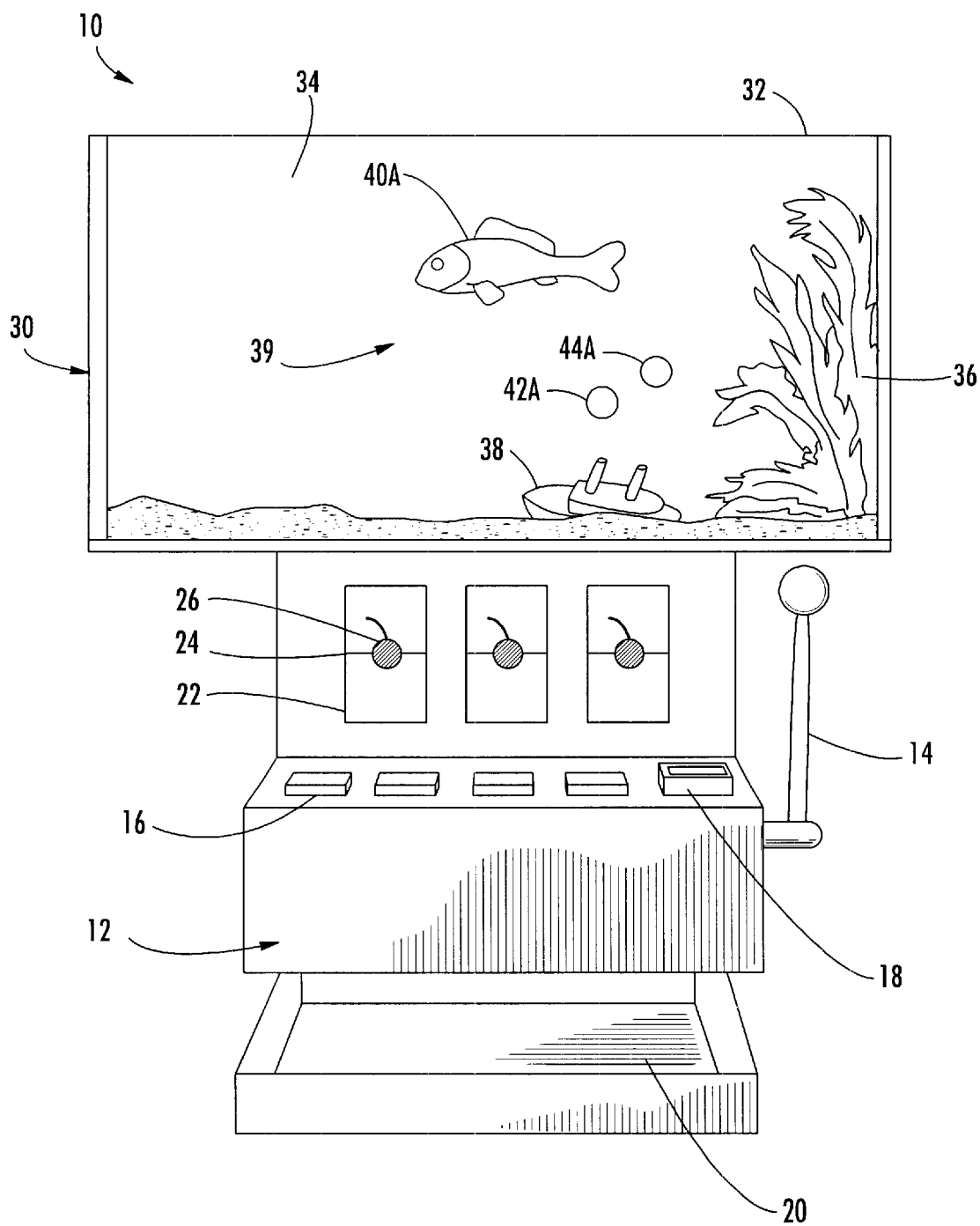
FIG. 1 is substantially a front view a gaming machine of the present invention.

As seen in FIGS. 1–4, the present invention comprises a gaming device, generally indicated by reference number 10. Gaming device 10 comprises a gaming machine 12 and a display 30.

Gaming machine 12 may be any of a large number of devices that are adapted to allow a game player to play a game. For example, gaming machine 12 may utilize spinning reels 22 with a payline 24 or a video display (not shown) to display outcomes of the game. A button 16 may be provided to select a winning outcome such as in a video poker game. Means may also be provided for accepting wagers, such as a coin slot 18 and for awarding prizes, such as a coin dispenser 20. Symbols 26 are placed on reels 22 to indicated different prizes or game winning events. A handle 14 is provided for activating gaming machine 12 to begin a game. The gaming machine 12 can be a conventional slot machine.

A display 30 is mounted on top of gaming machine 12. Display 30 comprises a case 32, panel 34, movable or animated objects 39 such as a fish 40 and bubbles 42 and 44, optical fibers 50, light source 64 and controller 72. The animated objects 39 are given the appearance of moving or changing by being connected to different optical fibers that are turned on or off in a sequential manner.

Display 30 has a case 32 that defines a cavity 33. A panel 34 is mounted to the front of case 32. Panel 34 is used to mount entertaining graphics and displays that are viewed by a game player while playing gaming machine 12. Panel 34 may be covered with a clear cover such as a Lucite or acrylic sheet (not shown) to protect panel 34. Panel 34 has visually appealing graphics. In this example, an aquarium or underwater theme is used on panel 34. Other objects and themes could be used. Panel 34 has fixed objects such as plants 36 and a shipwreck 38. Panel 34 also has animated objects 39 in FIG. 1 such as fish 40A and bubbles 42A. In FIG. 2, the objects are moved to new positions 40B, 42B and 44B. A bundle or array 56 of optical fibers 50 are mounted in and around each of the animated fish 40A,B and bubbles 42A,B and 44A,B.

Figure 3:
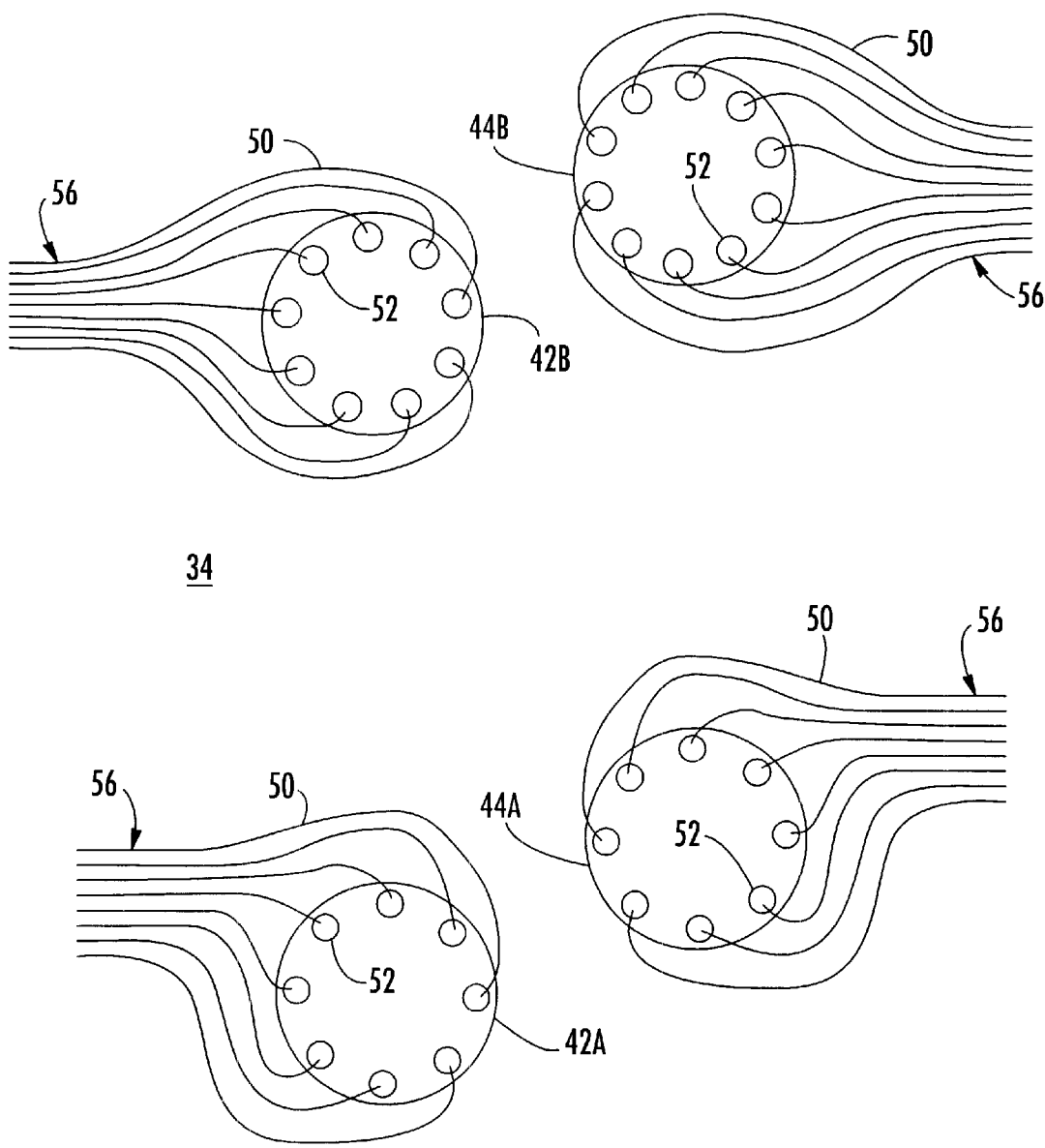
FIG. 3 is substantially a front enlarged view of the optical fibers mounted to a panel.
Figure 4:
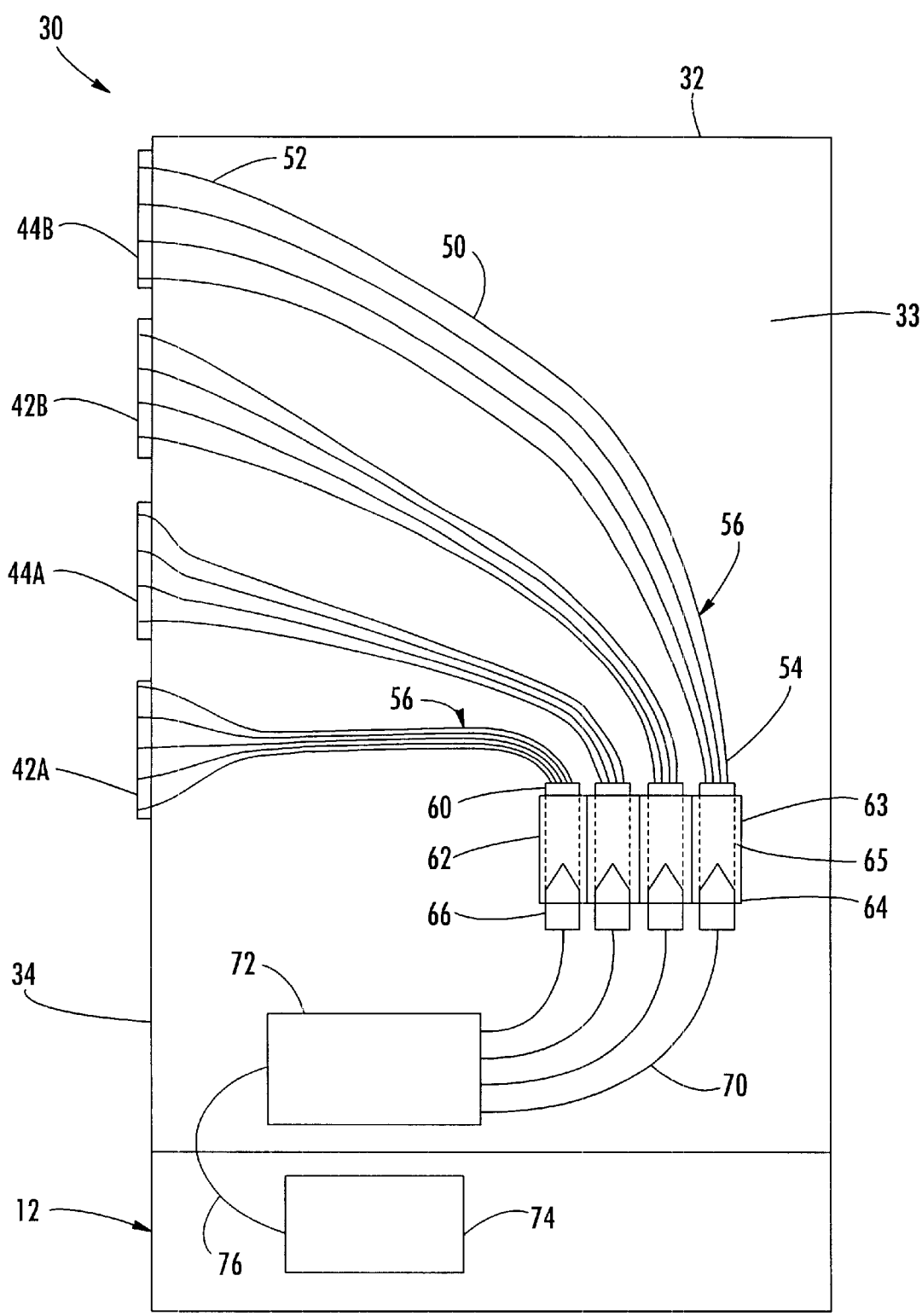
FIG. 4 is substantially a side view of FIG. 1.

The optical fibers 50 have ends 52 and 54. End 52 protrudes through panel 34 and fish 40A, B and bubbles 42A, B, and 44A, B. Ends 52 are spaced evenly around and within the object they are intended to illustrate. For example, FIG. 3 shows the arrangement of ends 52 around the bubbles 42A, B and 44A, B. Ends 52 are viewable by a game player playing gaming machine 10. End 52 is preferably retained to panel 34 by an adhesive. From end 52, the individual optical fibers 50 come together to form a bundle or array of fibers 56. The bundle 56 at end 54 is attached to an optical connector 60.

An optical housing 62 has a top end 63 and a bottom end 64. Several bores 65 are located in housing 62. Connector 60 is mounted in bores 65 in top end 63. A light source 66 is mounted in bores 65 in bottom end 64. The housing holds the light source 66 adjacent to ends 54 of the optical fibers. The light sources can be light emitting diodes. The light emitting diodes can be one color or wavelength or can be different wavelengths. The light source also could be a laser, or an incandescent light. A controller 72 is connected to the light source 66 by a cable 70. Controller 72 can also be in communication with a game controller 74 located in gaming machine 12. Game controller 74 is connected to controller 72 through a cable 76. Game controller 74 is adapted to cause controller 72 to turn the light sources 66 on and off in response to a game playing event. Controller 72 is operable to turn on and off the light emitting diodes 66 such that light is transmitted into differing bundles 56 at any given time. By sequentially turning the light emitting diodes on and off, the animated objects 39 appear to move between a first and a second position.

Figure 2:
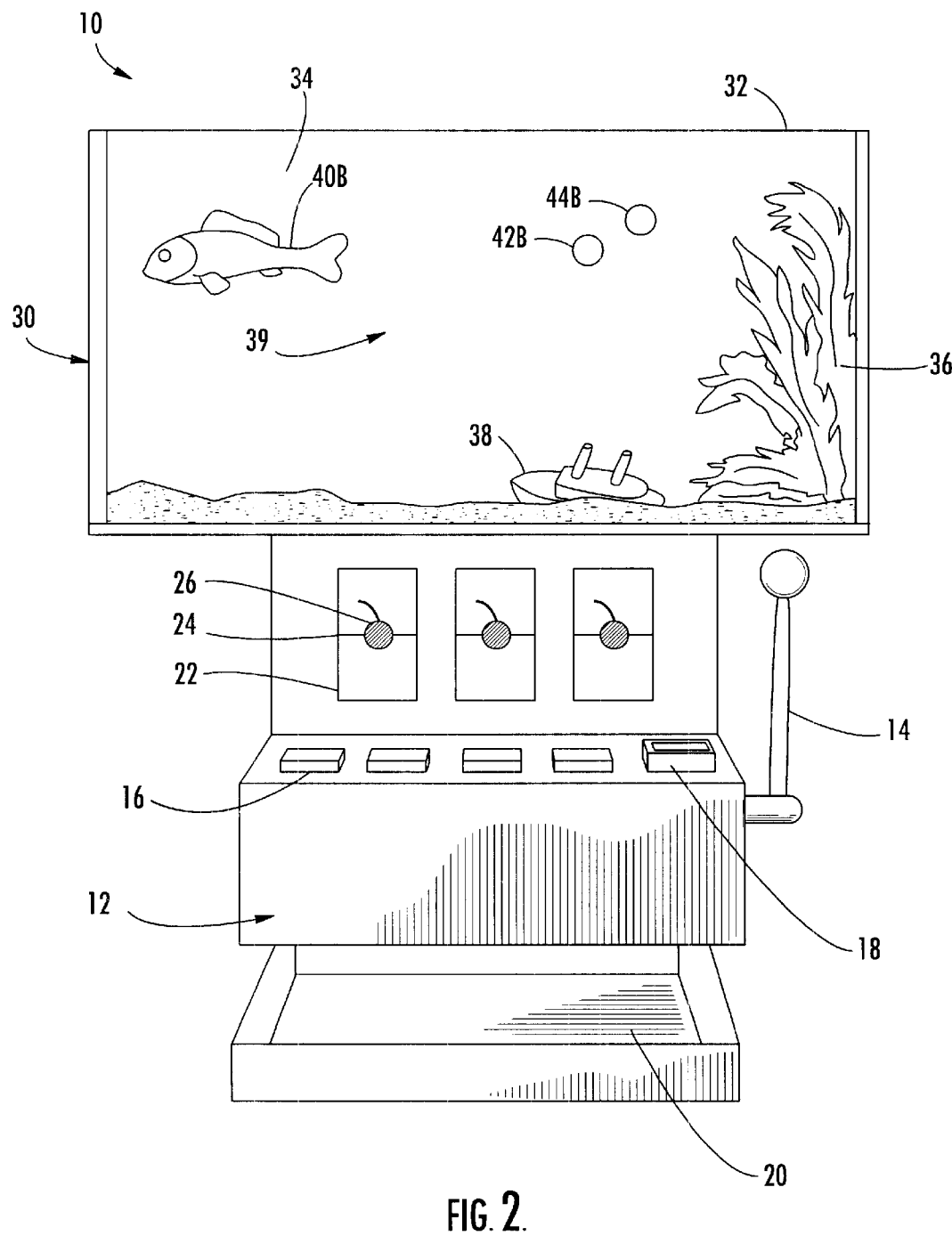
FIG. 2 is substantially a view of FIG. 1 in which different optical fibers are illuminated.

During the operation of display 30, fish 40A and bubbles 42A and 44A of FIG. 1 are illuminated for a fraction of a second by the continuous emission of light from fiber ends 52. There is a sequential change in illumination from fish 40A to fish 40B in FIG. 2 and from bubbles 42A, 44A to bubbles 42B and 44B. The change in illumination of the bundles makes it appear that the fish and bubbles are changing positions or moving. There may be some overlap in the illumination of the fish and bubbles at both positions to enhance the sensation of movement. The sequential illumination of fish 40 at positions 40A and 40B and of bubbles 42 and 44 at positions 42A, B and 44A, B makes it appear to a game player viewing display 30 that the fish is moving or swimming and that the bubbles are rising.

While the above animated illuminated display may be done in white light or any other single color, it becomes more attractive when accomplished in a variety of colors. For example, the display may change from green to blue to red colors or a combination of colors. The change of colors is accomplished by using different colored light sources 66. While several optical fibers were used in display 30, it is realized that thousands of sequentially programmable optical fibers could be used to create a high pixel or resolution display. A display can be created with thousands of fibers, with multi colored light sources and with a control system that is programmed to illuminate the ends of the fibers in any manner desired.

The above-described embodiment of the invention is only one example of the type of illuminated, changing or animated display that can be used. Animated displays based on themes other than aquatic can be used. Since game controller 74 is connected to controller 72, game controller 74 can be programmed to activate controller 72 in response to different game events. For example, when a player wins or qualifies for a bonus, display 30 can be activated to show an interesting display or can indicate or announce what the game player has won.

The purpose of display 30 is to attract and entertain players to a slot machine. The unique presentation on display 30 when mounted to a gaming machine 12 stands out from other gaming devices in a casino. When display 30 is operated, it produces a vivid display that attracts the attention of people nearby and provides an exciting display for players playing gaming device 10.

CONCLUSION

It can now be seen that the present invention solves many of the problems associated with the prior art. The present invention provides a lighted display that is attractive and entertaining for use with a primary game or a bonus game. The present invention provides a display that utilizes optical fibers to make an animated object appear to move. The moving animated object is visually appealing and unusual. The present invention provides a display that creates images that attract attention to a gaming machine such as a slot machine. Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A display for use with a gaming machine, the gaming machine allowing game play by a game player, the display comprising:

(a) a case mounted to the gaming machine, the case defining a cavity therein;

(b) a panel mounted in the case;
(c) a plurality of optical fibers, the optical fibers each having a first end and a second end, the first end of the optical fibers attached to and extending through the panel;
(d) at least one light source disposed adjacent the second end of the optical fibers, the light source adapted to transmit visible light along the optical fibers; and
(e) a controller in communication with the light source, the controller being configured to cause the light source to emit light in a predetermined sequence such that recognizable images on the panel are viewable by the game player.

2. The display of claim 1 wherein the controller turns at least two light sources on and off to make the image appear to be animated.

3. The display of claim 1 wherein the light source comprises a first and second light emitting diode, wherein the controller is configured to cause the first light emitting diode to emit light at a different time than the second light emitting diode.

4. The display of claim 3 wherein the first light emitting diode is configured to emit light in a different wavelength than the second light emitting diode.

5. The display of claim 1 wherein the display is mounted to a slot machine.

6. The display of claim 3 wherein the second end of the optical fibers form a bundle.

7. The display of claim 6 wherein the bundle is attached to a connector.

8. The display of claim 7 wherein the light emitting diodes are mounted in a first end of a housing and the connector is received in a second end of the housing.

9. The display of claim 7 wherein a cable connects the light emitting diodes to the controller.

10. The display of claim 1 wherein the controller is in communication with a second controller located in the gaming machine, the second controller adapted to cause the controller to change the image in response to a game playing event.

11. A display for producing a movable image, the display mounted to a gaming machine, the display comprising:
(a) a case mounted to the gaming machine, the case defining a cavity therein;
(b) a panel mounted in the case;
(c) a first set of optical fibers, the first set of optical fibers having a first end and a second end, the first end of the optical fibers attached to and extending through the panel;
(d) a second set of optical fibers, the second set of optical fibers having a first end and a second end, the first end of the optical fibers attached to and extending through the panel;
(e) a first light source disposed adjacent the second end of the first set of optical fibers, the first light source adapted to emit light into the first set of optical fibers;
(f) a second light source disposed adjacent the second end of the second set of optical fibers, the second light source adapted to emit light into the second set of optical fibers; and
(g) a first controller mounted in the cavity, the first controller in communication with the first and second light sources, the first controller being configured to cause the light sources to emit light in a predetermined sequence such that a movable recognizable image is formed on the panel and is viewable by the game player.

12. The display according to claim 11 wherein the light source is a light emitting diode.

13. The display according to claim 11 wherein the light source is a laser.

14. The display according to claim 11 wherein the light source is an incandescent light.

15. The display according to claim 14 wherein the first light source emits light in a first wavelength and the second light source emits light in a second wavelength.

16. The display according to claim 11 wherein the gaming machine is a slot machine.

17. The display of claim 11 wherein the second end of the first set of optical fibers form a first bundle and the second end of the second set of optical fibers form a second bundle.

18. The display of claim 17 wherein the first bundle is attached to a first connector and the second end is attached to a second connector.

19. The display of claim 18 wherein the first and second light sources are mounted in a first end of a housing and the first and second connectors are received in a second end of the housing.

20. The display of claim 19 wherein the first end of the housing has a plurality of bores and the second end of the housing has a plurality of bores, the light sources mounted in the bores, the connectors mounted in the bores.

21. The display of claim 11 wherein the first controller is in communication with a second controller located in the gaming machine, the second controller adapted to cause the first controller to move the image in response to a game playing event.

22. An apparatus for playing a game by a game player, the apparatus comprising:
(a) a gaming machine, the gaming machine adapted to generate a game event;
(b) a display mounted to the gaming machine, the display having a case, the case defining a cavity therein;
(c) a panel mounted in the case;
(d) at least one animated object located on the panel at a first position and a second position;
(e) a first set of optical fibers, the first set of optical fibers having a first end and a second end, the first end of the first set of optical fibers arranged in and around the animated object in the first position;
(f) a second set of optical fibers, the second set of optical fibers having a first end and a second end, the first end of the second set of optical fibers arranged in and around the animated object in the second position;
(g) a first light source disposed adjacent the second end of the first set of optical fibers, the first light source adapted to emit light into the first set of optical fibers;
(h) a second light source disposed adjacent the second end of the second set of optical fibers, the second light source adapted to emit light into the second set of optical fibers; and
(i) a first controller in communication with the first and second light sources, the first controller being configured to cause the first fight source to emit light at a first time and the second light source to emit light at a second time such that the animated object appears to move between the first and second position.

23. The display according to claim 22 wherein the first and second light sources are light emitting diodes.

24. The display according to claim 22 wherein the gaming machine is a slot machine.

25. The display of claim 22 wherein the second end of the first set of optical fibers form a first bundle and the second end of the second set of optical fibers form a second bundle.

26. The display of claim 25 wherein the first bundle is attached to a first connector and the second end is attached to a second connector.

27. The display of claim 26 wherein the first and second light sources are mounted in a first end of a housing and the first and second connectors are received in a second end of the housing.

28. The display of claim 27 wherein the first end of the housing has a plurality of bores and the second end of the housing has a plurality of bores, the light sources mounted in the bores, the connectors mounted in the bores.

29. The display of claim 22 wherein the first controller is in communication with a second controller located in the gaming machine, the second controller adapted to cause the first controller to move the animated object in response to the game event.

30. A method of providing a display for a gaming machine comprising:

(a) providing a panel mounted in the gaming machine, the panel having at least one animated object located on the panel at a first position and a second position;

(b) providing a first set and second set of optical fibers, the first set of optical fibers having a first end and a second end, the first end of the first set of optical fibers arranged in and around the animated object in the first position, the second set of optical fibers having a first end and a second end, the first end of the second set of optical fibers arranged in and around the animated object in the second position;

(c) providing a first light source disposed adjacent the second end of the first set of optical fibers, the first light source adapted to emit light into the first set of optical fibers, a second light source disposed adjacent the second end of the second set of optical fibers, the second light source adapted to emit light into the second set of optical fibers; and (d) controlling the first and second light sources to cause the first light source to emit light at a first time and the second light source to emit light at a second time such that the animated object appears to move between the first and second position.

31. The display of claim 30 wherein the animated object is moved in response to a game event occurring on the gaming machine.

* * * * *